United States Patent [19]
Janson

[11] Patent Number: 5,740,695
[45] Date of Patent: Apr. 21, 1998

[54] SHIFT DEVICE FOR A MANUAL TRANSMISSION

[75] Inventor: David Allen Janson, Plymouth, Mich.

[73] Assignee: Ford Global Technologies, Inc., Dearborn, Mich.

[21] Appl. No.: 593,067

[22] Filed: Jan. 29, 1996

[51] Int. Cl.⁶ .................................................. F16H 59/02
[52] U.S. Cl. ............................. 74/337.5; 74/473 R
[58] Field of Search ..................... 74/473 R, 745, 74/337.5

[56] References Cited

U.S. PATENT DOCUMENTS

| | | |
|---|---|---|
| 2,577,019 | 12/1951 | Kesterton . |
| 2,929,260 | 3/1960 | Hodkin ............................ 74/337.5 |
| 3,370,477 | 2/1968 | Lewis ............................. 74/337.5 |
| 3,696,686 | 10/1972 | Steele . |
| 3,954,021 | 5/1976 | Mraz ............................. 74/337.5 |
| 4,377,093 | 3/1983 | Janson . |
| 4,532,823 | 8/1985 | Razzacki . |
| 4,802,572 | 2/1989 | Shorey ............................ 74/337.5 |
| 5,271,291 | 12/1993 | Knape . |
| 5,390,559 | 2/1995 | Thomas et al. . |

FOREIGN PATENT DOCUMENTS

| | | | |
|---|---|---|---|
| 727783 | 6/1932 | France ............................ 74/337.5 |
| 4115-675-A1 | 2/1992 | Germany . |
| 410580 | 5/1934 | United Kingdom ................... 74/337.5 |

*Primary Examiner*—Khoi Q. Ta
*Assistant Examiner*—David M. Fenstermacher
*Attorney, Agent, or Firm*—Frank G. McKenzie; James J. Dottavio

[57] ABSTRACT

A transmission shift rail with a control rail 12 and shift fork 30. A pin 26 extends into a translation slot 36 in the shift fork 30 to produce axial movement of the shift fork 30 when the control rail 12 rotates, without translating the shift fork 30 when the control rail 12 translates.

31 Claims, 3 Drawing Sheets

5,740,695

1

SHIFT DEVICE FOR A MANUAL TRANSMISSION

BACKGROUND OF THE INVENTION

1. Field of the Invention

This invention relates to manual transmission shift devices, and more particularly to a shift rail and shift fork design for such a transmission.

2. Description of the Prior Art

To reduce the manufacturing cost and friction during gear shifts, U.S. Pat. No. 5,271,291 to Knape ('291) utilizes a locking shaft (7) in parallel to a control rail (4) to longitudinally lock the synchronizers (11a–d) into position until the gear associated with that synchronizer was selected by rotating the control rail to a designated position. The locking shaft design of the '291 patent requires an additional rotating shaft (7) and the alignment of several cams (32–35) on the shaft (7) to the shift forks (11a–d) on the control rail (4) to lock the shift forks against translation.

The Knape '291 design also utilizes several pins (10) through the control rail (4) to engage shifting sleeves (16) which have projecting claws (20) to move the shift forks when the control rail (4) translates. Knape '291 has recesses (21) at the ends of the shift forks (11a–d) which enable the control rail (4) to translate without moving the shift forks (11a–d) when the claws (20) and recesses (21) are aligned. The parallel shaft requires additional package space and requires precise alignment of the cams and shift forks to provide for movement of the proper shift fork when desired, and Knape '291 requires translation of the control rail to produce translation of the shift forks.

U.S. Pat. No. 2,557,019 ('019) to Kesterton uses a hollow shaft (a) with helical slots (c) therein to produce a linear movement of a slidable member (e) when the hollow shaft (a) is rotated. Kesterton '019 uses a parallel selecting member (f) to move plungers (h) to selectively engage a plunger (h) into a helical slot (c) and thereby enable axial movement of a sliding member (e) when the hollow shaft (a) rotates. Kesterton also uses a longitudinal bar (m) having notches (n) to prevent movement of the sliding member (e) when a plunger (h) is not engaged with the helical slot (c). Kesterton '019 requires the installation and alignment of several parts, including the selecting member (f), the bar (m), several spring-loaded plungers (h), and helical slots (c) to enable movement of the slidable member (e) when the hollow shaft (a) rotates. Kesterton requires two plungers (h) for each sliding member (e) to move the sliding member in opposite directions. The plungers (h) must be selectively disengagable with the hollow shaft (a) to ensure the sliding members do not move while the hollow shaft is rotated when movement of the sliding members is not desired. Further, there is no suggestion of an axial movement of the hollow shaft or any member other than a sliding member, nor any suggestion of moving a sliding member with an axial movement of the hollow shaft.

It would be desirable to provide rotational and translation control of a shift fork using a minimum number of parts requiring a minimal amount of alignment for those parts.

SUMMARY OF THE INVENTION

It is an object of this invention to provide a manual transmission shift rail design which enables control of a series of synchronizers to provide for multiplication of gear ratios and/or double disconnect relatively rotating transmission shafts. A device according to the present invention requires minimal package space, is made from a minimal number of parts and is easily aligned In realizing this objective the transmission according to this invention includes a control rail and shift fork with a means for translating the shift fork when the control rail rotates and a means for preventing translation of the shift fork when the control rail translates.

DESCRIPTION OF THE PREFERRED EMBODIMENTS

Figure 1:
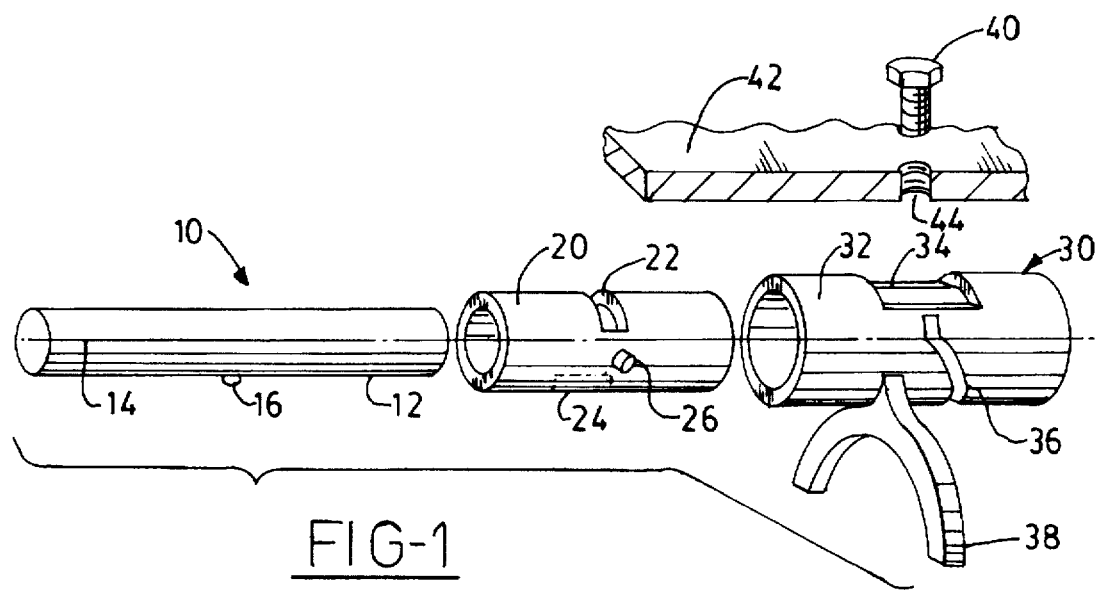
FIG. 1 is a partial exploded assembly of a shift rail according to the present invention.

Referring to FIG. 1, a partial exploded view of a shift rail assembly 10 is shown. A control rail 12 extends along an axis 14, about which the control rail 12 may rotate or translate axially as determined by the movement of a shift lever 50 shown in FIG. 4, which is manipulated by an operator in a manner well known in the art. A first projection, such as a rotation pin 16, is fixed to the control rail 12 in any known manner, such as welding, press fit, or threaded attachment, and extends radially therefrom. Alternatively, the rotation pin 16 could be integrally formed by known means such as machining or forging. In the preferred embodiment, the pin 16 is press fit into the control rail 12 to facilitate assembly and serviceability and provide for a reliable attachment thereto.

Figure 2:
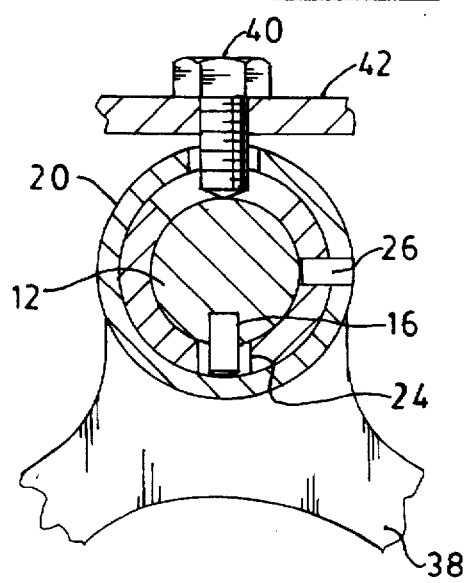
FIG. 2 is a cross-sectional view of the shift rail shown in FIG. 1 in an assembled state.

A cylindrical member, or rotation cam 20, extends coaxially and partially coextensively with the control rail 12. The rotation cam 20 has a radial slot 22, a first axial slot 24, and a second projection extending radially therefrom. In the embodiment shown in FIG. 1, the second projection is a translation pin 26 fixed to the rotation cam as described above for the rotation pin 16. The rotation pin 16 projects through the first axial slot 24 in the rotation cam 20 as shown in FIG. 2. As the control rail 12 moves axially, the rotation pin 16 moves within the first axial slot 24 and thereby does not move the rotation cam 20 axially. However, when the control rail 12 is rotated, the pin 16 engages the first axial slot 24 and causes the rotation cam 20 to rotate therewith. A projection means 40 extends into the first radial slot 22 in the rotation cam 20 to prevent axial movement of the rotation cam 20. In the preferred embodiment, the projection means 40 comprises a screw threaded through a hole 44 in the transmission case 42 having a dog pointed end which extends into the slot 22 in the rotation cam 20.

A shift fork 30 has a cylindrical portion 32 extending coaxially and partially coextensive with the rotation cam 20. The shift fork 30 has a second axial slot 34, and a translation slot 36 therein. The shift fork 30 has a forked end 38, which engages a synchronizer (not shown) within the furcations to move the synchronizer axially to engage and disengage gearsets in a known manner. The engagement of the synchronizer by the forked end 38 will resist rotation of the shift fork 30, but in the embodiment shown in FIG. 1, the projection means 40 extends into the second axial slot 34 to further prevent rotation of the shift fork 30, and the projection means 40 extends further into the first radial slot 22 of the rotation cam 20 as described above.

The translation pin 26 projects through the translation slot 36 within the cylindrical portion of the shift fork 32 as shown in FIG. 2. In the preferred embodiment, the translation pin 26 continually engages the translation slot 36 by continually projecting into the slot 36. As the control rail 12 rotates to induce the rotation cam 20 to rotate, the translation pin 26 engages the translation slot 36 and causes the shift fork 30 to translate axially when the translation pin 26 engages the ramp 58 of the translation slot 36 shown in FIG. 3. The projection means 40 prevents the shift fork 30 from rotating, so when the translation pin 26 is rotated in either direction between the ½ position 52 and ¾ position 54 in the translation slot 36 as shown in FIG. 3, the shift fork 30 translates.

Figure 3:
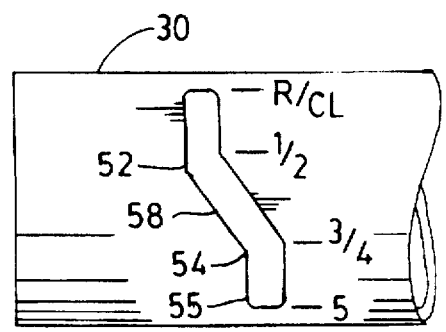
FIG. 3 is a detail of a translation slot for the shift fork shown in FIG. 1.

In the embodiment shown in FIG. 1, the translation slot 36 has a first portion extending substantially radially, as shown in FIG. 3 between the 5 position 55 and the ¾ position 54. The translation slot 36 has a second portion between the ¾ position 54 and the ½ position 52 which is ramped, traversing the cylindrical portion in an oblique manner; the ramped portion extending both axially and radially. Thus when the translation pin 26 is rotated within the first portion of the translation slot, the shift fork will not move axially when translation pin 26 is between the 5 position 55 and ¾ position 54 as the slot 36 extends radially therebetween. However, further rotation of the translation pin 26 between the ¾ position 54 and ½ position 52 will cause the shift fork 30 to move axially due to the resultant axial force produced on the shift fork 30 when the translation pin 26 is moved through this ramped second portion of the oblique translation slot 36, while the shift fork is prevented from rotating due to the projection means 40 in the axial slot 34. The angle of the ramp is determined by the axial distance the shift fork must travel to engage the synchronizer with the desired gear relative to the rotational movement during the crossover shift. Thus, when the operator moves the gear selector 50 shown in FIG. 4 either direction between the ½ position 52 and the ¾ position 54 shown in FIG. 3, the shift fork 30 is moved axially as shown in FIG. 1, thereby causing the shift fork 30 to move a synchronizer (not shown) to engage or disengage a gear to effectuate an additional gear reduction as is well known in the art. The device of the preferred embodiment thereby acts as a crossover shift device, as it engages or disengages a gear ratio when the shift lever is crossing over between gear selections. In the preferred embodiment, the crossover device engages a gear when crossing over in a first direction from a first position to a second position and disengages the same gear when crossing back to the first position. In a first position 52 shown in FIG. 3, an additional reduction gear is engaged to produce low ranges (R, Cl, 1, 2). When crossed over to a second position 54, the additional reduction gear is disengaged and gears 3–5 are produced without the crossover reduction. Alternatively, one skilled in the art could create a neutral position in a shift device according the present invention. In such a design, the operator could move the shift fork 30 to a position midway between the crossover ratios 52, 54 to disengage a gear and thereby create a neutral condition at that position.

The rotation cam 20 also acts as a means to prevent axial movement of the shift fork 30 when the control rail 12 is moved axially. The shift fork 30 does not move axially when the control rail 12 is moved axially because the rotation cam 20 is prevented from moving axially due to the radial slot 22 and projection means 40, and the axial movement of the control rail 12 is not transmitted thereto. Thus the rotation cam 20 is not moved axially and the axial movement of the control rail 12 is not transmitted to the shift fork 30. The translation pin 26 further prevents axial movement of the shift fork 30 (unless the rotation cam 20 is rotated), as the translation pin 26 projects through the rotation slot 36.

In the preferred embodiment, during a crossover shift a synchronizer is moved as described above to produce a further ratio reduction or increase, such as through a planetary gearset. An example of this is shown in U.S. Pat. No. 5,390,559 to Thomas ('559), assigned to the assignee of the present invention, and which is incorporated herein for reference. Such a crossover shift may be used in the transmission shown in FIGS. 9 and 10 of the '559 patent. This device could be used between the ¾ and OD positions to move a synchronizer 278 and produce a ratio through either the sun gear 272 or output shaft 260, thereby producing either the 2 or OD ratio when a second synchronizer 280 engages the 2/OD gear 270. As would be obvious to one skilled in the art, the present crossover shift mechanism could be used to create a large number of ratios in the transmission shown in the '559 patent, or any other patent having two or more synchronizers in series.

Figure 4:
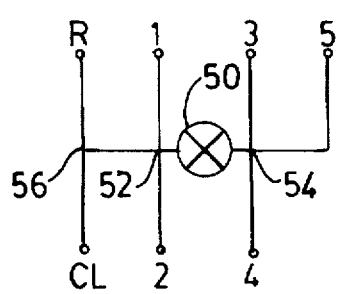
FIG. 4 is an example of a shift pattern for the control rail of FIG. 1.
Figure 5:
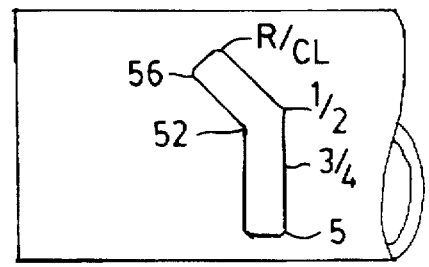
FIG. 5 is an alternate detail of a translation slot to that shown in FIG. 3.

Alternatively in the present invention, the translation slot 36 as shown in FIG. 3 could be made as shown in FIG. 5 to effectuate a reduction only in the R and CL positions 56. Thus when the gear selector of FIG. 4 is moved from ½ 52 to R/CL 56, an additional reduction is made to create these lower ratios. Any number of modifications could be made to the present invention, such as increasing the ratio when shifting from ¾ to 5 as shown in FIG. 4 to create overdrive ratios. Further such embodiments would be obvious to one skilled in the art and need not be listed here.

As would also be obvious to one skilled in the art, the pins and slots as described above could be reversed. For example in FIG. 1, the rotation pin 16 could be secured to the rotation cam 20 (instead of being secured to the control rail as shown in FIG. 1) and the control rail 12 would have an axial slot therein (instead of the slot in the rotation cam shown in FIG. 1). Thus, when the control rail 12 is translated axially, the rotation pin 16 would move within the axial slot (not shown), but when the control rail is rotated, the slot would cause the pin 16 to be rotated, and thus rotate the rotation cam 20. Likewise, the translation pin 26 could be secured to the shift fork 30 and the translation slot (not shown) could be formed in the rotation cam 20 to create the movement described above in the preferred embodiment.

As is known to one skilled in the art, the remainder of the gear ratios in a transmission according to the present invention is changed in a known manner, either as described in Thomas '559, or any conventional manual transmission design as is well known in the art. Additionally, more than one of the above-described crossover shift devices may be mounted on a shift rail to create a series of gear reductions.

Figure 6:
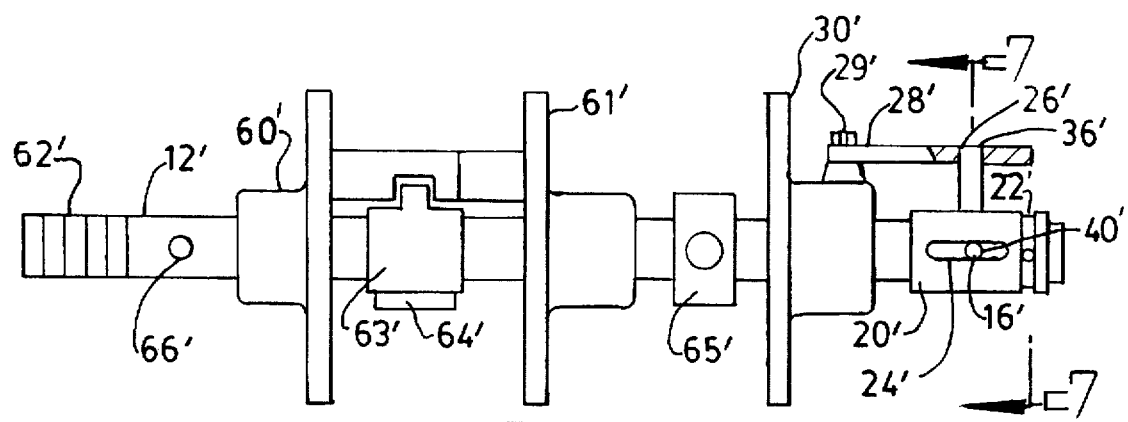
FIG. 6 is an alternate embodiment of a shift rail according to the present invention.
Figure 8:
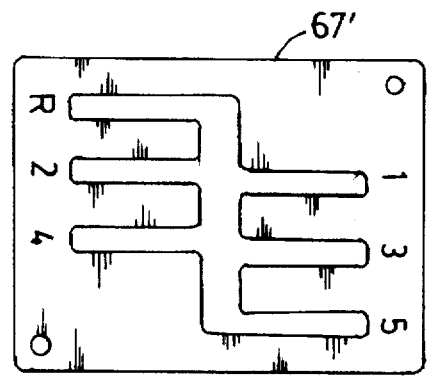
FIG. 8 is a view of a gate plate for the shift rail shown in FIG. 6.

An example of the preferred embodiment of the present invention is shown in FIG. 6. In this embodiment, a single control rail 12' has three shift forks 30', 60', 61' mounted thereon. The first two forks 60', 61' move synchronizers to engage and disengage gears as is well known in the art. These forks 60', 61' are moved by a shift finger 62' as is well known in the art when the operator moves a shift lever (not shown) connected to a socket 65' which causes the control rail 12' to move axially and to rotate in a known manner. The movement of the control rail 12' is controlled by using a gate pin 66' which engages a gate plate 67' as shown in FIG. 8. As the operator attempts to move the shift lever (not shown), it can only be moved to positions where the gate plate pin 66' moves within the slot of the gate plate 67'.

Figure 7:
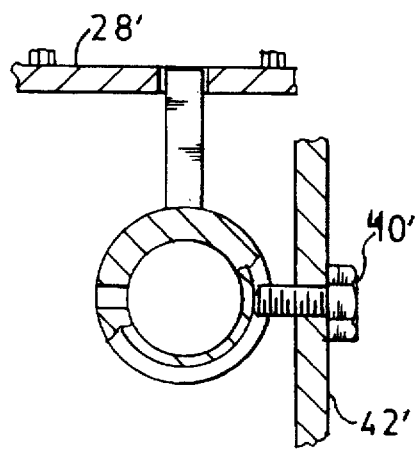
FIG. 7 is a partial sectional view of the shift rail shown in FIG. 6.
Figure 9:
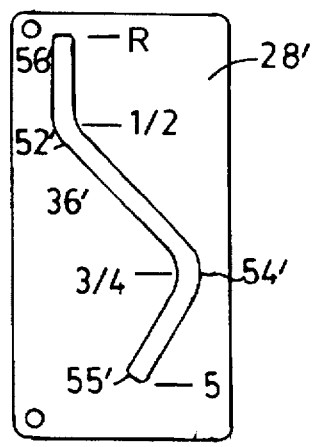
FIG. 9 is a view of a cam plate for the shift rail shown in FIG. 6.

The third shift fork 30' shown in FIG. 6 is moved in a manner similar to that described for the shift fork 30 shown in FIG. 1, but in the preferred embodiment of FIG. 6 the translation slot 36' is carried on a cam plate 28' which is preferably mounted to the shift fork 30' using bolts 29', but may be attached in any known manner such as welding. As shown in FIG. 7, the projection means 40' is threaded into the transmission case 42' and engages an annular slot or groove 22' in the rotation cam 20' to prevent axial movement of the cam 20'. As the control rail 12' is moved axially, a pin 16' projecting from the control rail 12' moves axially in the axial slot 24' in the rotation cam 20'. As the control rail 12' is rotated, the pin 16' engages the side of the slot 24' and causes the rotation cam 20' to rotate therewith. As the rotation cam 20' rotates, the pin 26' projecting from the rotation cam 20' moves within the slot 36' of the cam plate 28'. When the pin 26' moves in the slot 36' as shown in FIG. 9 between the R position 56' and ½ position 52, the shift fork 30' remains stationary. But when the pin 26' moves between the ½ position 52 and ¾ position 54 or ¾ position 54 and 5 position 55, the movement of the pin 26' along the angle of the slot which traverses the cam plate obliquely forces the cam plate 28' to move axially, thereby causing the shift fork 30' to move likewise. The cam plate 28' does not rotate because the shift fork 30' is prevented from rotating due to engagement with the synchronizer (not shown), or by the projection means described above.

Figure 10:
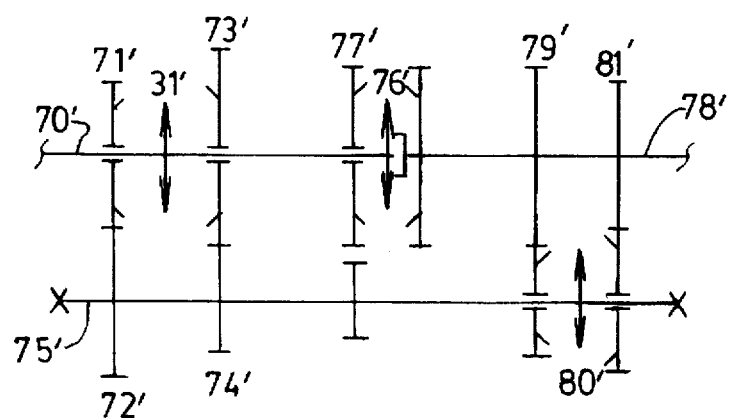
FIG. 10 is a schematic diagram for a transmission using the shift rail of FIG. 6.

An example of a transmission using a control rail 12' like that shown in FIG. 6 is provided schematically in FIG. 10. In the transmission of FIG. 10, when first or third gear are selected by the operator, the third synchronizer 31' is moved to the leftmost position shown in FIG. 10 by a shift fork 60' shown in FIG. 6. In this position, the input shaft 70' drivingly engages a first input pinion-gear pair 71', 72' through a synchronizer 31', drivingly engaging the countershaft 75' with a first input ratio to the countershaft 75'. To produce second or fourth gears, synchronizer 31' is moved to the rightmost position shown in FIG. 10 to engage a second pinion-gear pair 73', 74' and produce a second input ratio to the countershaft 75'. Finally, when the shift fork 60' is moved to a position intermediate the prior two, the synchronizer 31' is disengaged with the pinion gear pairs on the input shaft 70', and the countershaft 75' is not rotated thereby. In this third position, direct drive is performed by moving a second synchronizer 76' to the right as shown in FIG. 10 using a second shift fork 61' shown in FIG. 6. Thus when the direct drive is engaged, no losses or noise are incurred from the rotation of the countershaft and driven gearsets as is encountered in most transmissions.

When the second synchronizer 76' is moved leftwardly as shown in FIG. 10, the reverse pinion-gear pair 77' is drivably engaged with the input shaft 70'. A chain drive or idler gear (not shown) produces reverse drive between the reverse pinion-gear pair 77' as is well known in the art, and the countershaft 75' is thusly driven.

A first synchronizer 80' is provided on the countershaft 75' between the output pinion-gear pairs 79', 81'. This synchronizer 80' is used to select an output ratio, which, when combined with the input ratio or reverse drive, produces the driven ratio of the output shaft 78'. Thus, when the first input pinion-gear pair 71', 72' are engaged, a first output ratio is produced by moving the first synchronizer 80' leftwardly as shown in FIG. 10 to engage output pinion-gear pair 79'. To produce third gear, synchronizer 80' is moved rightwardly to engage the second output pinion-gear pair 81' when the first input pinion-gear pair 71', 72' are engaged. This same strategy is used to produce second or fourth gear when the second input pinion-gear pair 73', 74' is selected. Likewise, two reverse ratios could be produced, but only one is desired in the present application. The synchronizer 80' could alternatively be mounted on the output shaft to produce the drive ratios described above.

To produce direct drive, the first synchronizer 80' is positioned in a mid position, thereby not engaging either output pinion-gear pair 79', 81', and enabling a direct drive from the input shaft 70' to the output shaft 78' when the second input synchronizer 76' is moved rightwardly. The first synchronizer 80' is moved when the shift selector is moved laterally through the use of a crossover device as shown in FIGS. 6–9. The first synchronizer 80' shown in FIG. 10 is moved when the shift fork 30 shown in FIG. 6 is moved as described above.

Figure 11:
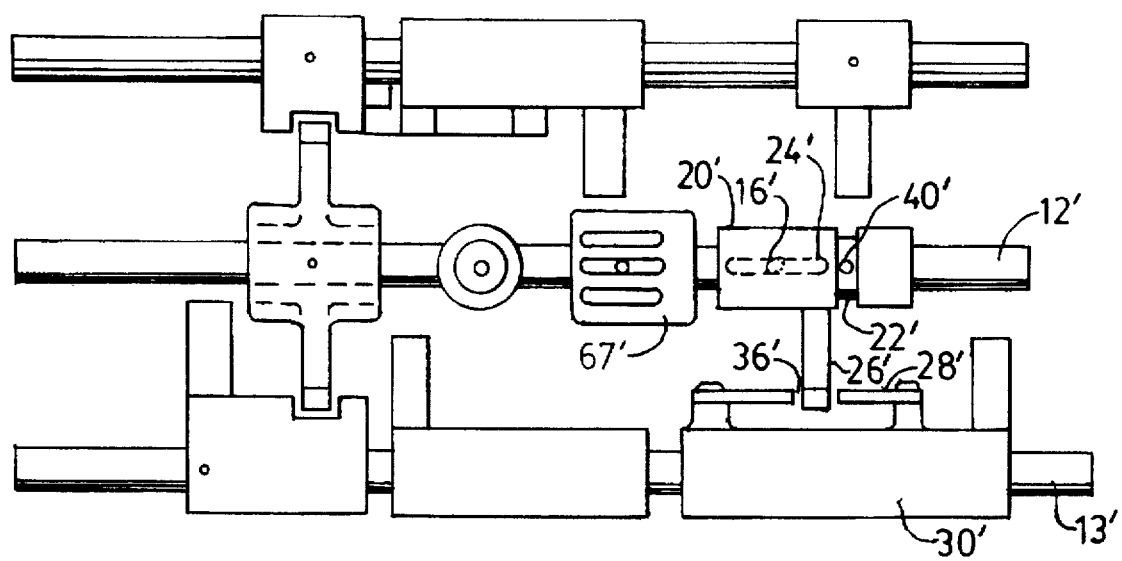
FIG. 11 is an alternate embodiment of a shift rail according to the present invention.

Another embodiment of the present invention is illustrated in FIG. 11. This embodiment is similar to that shown in FIG. 6, except the layout includes other components, including a second rail 13' parallel the control rail 12' to produce the shift fork movements described above. In the present embodiment, the shift fork 30' is slidably mounted on the second rail 13' and the shift fork 30' has a cam plate 28' mounted thereon, as described above. In this embodiment, the operation of the rotation cam 20' is the same as the preferred embodiment described above, but the translation pin 26' projects into the translation cam 28' mounted on the shift fork 30' on the parallel rail 13'. As in the above embodiments, a projection 40' grounded to the case (not shown) projects into a groove 22' in the rotation cam 20' to prevent axial movement thereof. The fork 30' is prevented from rotating by means described in prior embodiments. Thus when the rotation cam 20' is rotated, the pin 26' moves within the oblique slot 36' of the translation cam 28', thereby causing the shift fork 30' to move axially.

Figure 12:
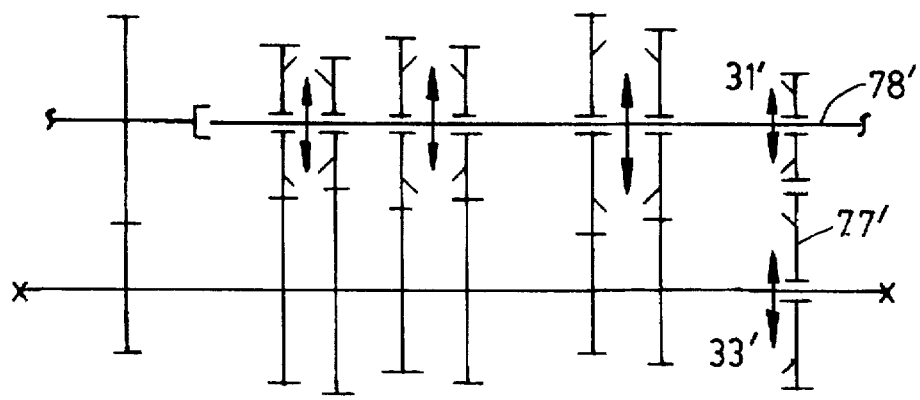
FIG. 12 is a schematic diagram for a transmission using the shift rail of FIG. 11.
Figure 13:
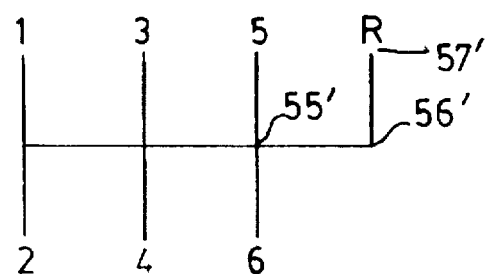
FIG. 13 is a shift pattern for the transmission shown in FIG. 12.
Figure 14:
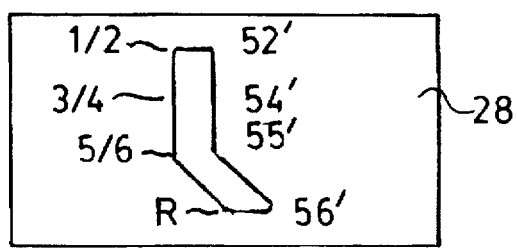
FIG. 14 is a view of a cam plate for the transmission shown in FIG. 12.

FIGS. 12 and 13 show a double-disconnect reverse transmission diagram and shift pattern using another embodiment of the present invention. The double disconnect is created because both the driving and driven gears are drivably disengagable. In FIG. 12, a first reverse synchronizer 31' engages the driven gear of the reverse pinion-gear pair 77 rotatably supported on the output shaft 78' during the motion of the shift lever laterally, as shown in FIG. 13, from the ⅘ position 55' to the lateral reverse position 56'. When the gearshift lever is moved forward as shown in FIG. 13 from the lateral reverse position 56' to the R position 57', the second reverse synchronizer 33' is moved rightwardly as shown in FIG. 12 to engage the driving gear of the reverse pinion-gear pair 77'. The reverse pinion-gear pair 77' is then driven through a chain or idler gear (not shown) as is well known in the art. The engagement of the first reverse pinion 31' is caused by a translation pin as shown in the prior embodiments engaging the translation slot of the rotation cam or rotation plate 28' shown in FIG. 14. Thus, as described in the prior embodiments, when the shift fork (not shown) is rotated and the translation pin (not shown) is moved from the 5/6 position 55' to the reverse position 56', the first reverse synchronizer engages the reverse gear 77' mounted on the output shaft 78'. The second reverse synchronizer 33' is moved in a conventional manner, either by using a shift fork mounted on the shift rail, or a shift fork mounted on a parallel rail and moved through the use of a shift finger, both of which are well known in the art to drivably engage the output shaft 78'.

Although the preferred embodiments of the present invention have been disclosed, various changes and modifications may be made without departing from the scope of the invention as set forth in the appended claims.

What is claimed is:

1. A transmission shift rail, comprising:
   a control rail;
   a shift fork;
   means for preventing translation of the shift fork when the control rail is translated; and
   means for translating the shift fork when the control rail rotates.

2. The shift rail of claim 1 further comprising a means for preventing rotation of the shift fork.

3. The shift rail of claim 2, wherein the means for preventing rotation of the shift fork comprises:
   the shift fork having a cylindrical portion with an axial slot therein; and
   a projection means fixed against rotation extending into the axial slot to prevent rotation of the shift fork.

4. The shift rail of claim 3, wherein the projection means comprises:
   said shift fork being encased within a transmission case having an aperture therein;
   a pin projecting from the aperture in the transmission case and extending into the axial slot of the shift fork.

5. The shift rail of claim 4, wherein the pin comprises a bolt threaded into the transmission case aperture.

6. The shift rail of claim 1, wherein the translation means comprises:
   the control rail having a projection extending radially therefrom; and
   the shift fork having a translation slot therein, and the projection of the control rail extending into the translation slot.

7. The shift fork of claim 6, wherein the translation slot comprises an aperture having a portion traversing the shift fork in an oblique manner.

8. The shift rail of claim 1, wherein the translation means comprises:
   the control rail having a projection extending radially therefrom;
   a rotation cam having an axial slot therein for engaging the projection on the control rail and a second projection extending from the rotation cam; and
   the shift fork having a translation slot therein, and the second projection extending into the translation slot in the shift fork.

9. The shift rail of claim 8, wherein the rotation cam and shift fork are supported by the control rail.

10. The shift rail of claim 8, wherein the rotation cam is supported by the control rail and the shift fork is supported by a second rail adjacent the control rail.

11. The shift rail of claim 8 wherein the translation pin continually projects into the translation slot.

12. The shift rail of claim 8 wherein the shift fork has a cylindrical portion having the translation slot therein.

13. The shift rail of claim 12 wherein the translation slot comprises the shift fork having an aperture which traverses the cylindrical portion in an oblique manner.

14. The shift fork of claim 13 further comprising a means for preventing rotation of the shift fork.

15. The shift fork of claim 14 wherein the means for preventing rotation of the shift fork, comprises:
   the cylindrical portion of the shift fork having an axial slot therein; and
   a projection means fixed against rotation extending into the axial slot to prevent rotation of the shift fork.

16. The shift rail of claim 14, wherein the means for preventing translation of the rotation cam comprises:
   a radial slot in the rotation cam; and
   a projection means being fixed against translation and extending into the radial slot.

17. The shift rail of claim 16, wherein the projection means comprises
   the shift fork being encased within a transmission case; and
   a pin projecting from the transmission case and extending into the radial slot of the rotation cam.

18. The shift rail of claim 8 wherein the shift fork further comprises a cam plate having the translation slot therein, the cam plate being mounted on the shift fork.

19. The shift rail of claim 18 wherein the translation slot comprises an aperture having a portion traversing the cam plate in an oblique manner.

20. A manual transmission having an input shaft, a countershaft, an output shaft, and a pinion and gear pair, comprising:
   a control rail;
   a shift fork;
   means for preventing translation of the shift fork when the control rail is translated;
   means for translating the shift fork when the control rail rotates; and
   a first synchronizer axially moveable by the shift fork for producing an output ratio to the output shaft.

21. The transmission of claim 20, wherein the translation means comprises:
   the control rail having a projection extending radially therefrom;
   a rotation cam having an axial slot therein for engaging the projection on the control rail and a second projection extending from the rotation cam; and
   the shift fork having a translation slot therein, and the projection of the rotation cam extending into the translation slot in the shift fork.

22. The transmission of claim 21 wherein the synchronizer is supported by one of the group consisting of the countershaft and the output shaft.

23. The shift rail of claim 21 wherein the translation slot comprises a cam plate supported by the shift fork with an aperture in the cam plate having a portion traversing the cam plate in an oblique manner.

24. The transmission of claim 21 further comprising:
   a second synchronizer supported by one of the group consisting of the input shaft and countershaft for selecting an input ratio to the countershaft.

25. The transmission of claim 24 further comprising a third synchronizer supported by one of the group consisting of the input shaft and output shaft for drivably connecting the input shaft and output shaft.

26. A manual transmission with a double disconnect having an input shaft, a countershaft, an output shaft, an input gear and an output gear, comprising:

a shift rail having a control rail, a first shift fork and a means for translating the first shift fork when the control rail rotates;

a second shift fork axially moveable when the control rail moves axially;

a first synchronizer for drivably connecting and disconnecting an output gear; and a second synchronizer for drivably connecting and disconnecting an input gear.

27. The transmission of claim 26, wherein the first synchronizer is axially movable by one of the first and second shift forks and the second synchronizer is axially moveable by the other of the first and second shift forks.

28. The transmission of claim 27, wherein the translation means comprises:

the control rail having a projection extending radially therefrom;

a rotation cam having an axial slot therein for engaging the projection on the control rail and a second projection extending from the rotation cam; and the shift fork having a translation slot therein, and the projection of the rotation cam extending into the translation slot in the shift fork.

29. The shift rail of claim 28 wherein the translation slot comprises a cam plate supported by the shift fork with an aperture in the cam plate having a portion traversing the cam plate in an oblique manner.

30. The shift rail of claim 28 wherein the translation slot comprises the shift fork having a translation slot therein, and the second projection extending into the translation slot in the shift fork.

31. A method of axially moving a synchronizer during a crossover shift, comprising the steps of:

providing a control rail;

providing a shift fork;

providing a means for preventing translation of the shift fork when the control rail is translated; and providing a means for translating the shift fork when the control rail rotates.

* * * * *